(12) United States Patent
Kawabata (10) Patent No.: US 9,531,884 B2
(45) Date of Patent: Dec. 27, 2016

(54) STEREO ECHO SUPPRESSING DEVICE, ECHO SUPPRESSING DEVICE, STEREO ECHO SUPPRESSING METHOD, AND NON-TRANSITORY COMPUTER-READABLE RECORDING MEDIUM STORING STEREO ECHO SUPPRESSING PROGRAM

(71) Applicant: Oki Electric Industry Co., Ltd., Tokyo (JP)

(72) Inventor: Naoya Kawabata, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 10 days.

(21) Appl. No.: 14/803,978

(22) Filed: Jul. 20, 2015

(65) Prior Publication Data

US 2016/0065743 A1 Mar. 3, 2016

(30) Foreign Application Priority Data

Aug. 27, 2014 (JP) ................................. 2014-173072

(51) Int. Cl.
*H04M 3/56* (2006.01)
*H04S 1/00* (2006.01)
(Continued)

(52) U.S. Cl.
CPC ............. *H04M 3/568* (2013.01); *H04R 3/005* (2013.01); *H04R 3/02* (2013.01); *H04W 4/06* (2013.01); *H04S 1/007* (2013.01)

(58) Field of Classification Search
CPC ............ H04W 4/06; H04R 3/02; H04R 3/005; H04S 1/007; H04M 3/568
See application file for complete search history.

(56) References Cited

U.S. PATENT DOCUMENTS 5,828,756 A * 10/1998 Benesty ................ H04M 9/082
379/406.08
6,694,020 B1 * 2/2004 Benesty ................ H04M 9/082
370/291

(Continued)

OTHER PUBLICATIONS

Shigenobu Minami (2011). A Stereo Acoustic Echo Canceller Using Cross-Channel Correlation, Adaptive Filtering, Dr Lino Garcia (Ed.), ISBN: 978-953-307-158-9, InTech, Available from: http://www.intechopen.com/books/adaptive-filtering/a-stereo-acoustic-echo-canceller-using-cross-channelcorrelation.*

*Primary Examiner* — Brenda Bernardi
(74) *Attorney, Agent, or Firm* — Rabin & Berdo, P.C.

(57) ABSTRACT

According to the embodiment of the present invention, the stereo echo suppressing device that suppresses an acoustic echo signal based on a near-end input signal and far-end signals of two channels as a stereo signal includes: first and second far-end signal amplitude spectrum calculating units for calculating amplitude spectrums of a first far-end signal and a second far-end signal; a near-end input signal amplitude spectrum calculating unit for calculating an amplitude spectrum of the near-end input signal; first and second estimation echo signal estimating units for estimating amplitude spectrums of a first estimation echo signal and a second estimation echo signal; first and second echo suppressing units for suppressing the acoustic echo signal; first and second echo path characteristic updating unit for calculating and updating echo path characteristics of the first far-end signal and the second far-end signal.

7 Claims, 5 Drawing Sheets

(51) Int. Cl.
*H04W 4/06* (2009.01)
*H04R 3/00* (2006.01)
*H04R 3/02* (2006.01)

(56) References Cited

U.S. PATENT DOCUMENTS

| | | | |
|---|---|---|---|
| 6,738,480 B1 * | 5/2004 | Berthault | H04M 9/082 370/290 |
| 6,895,093 B1 * | 5/2005 | Ali | H04B 3/23 379/406.01 |
| 7,058,185 B1 * | 6/2006 | Egelmeers | H03H 21/0027 379/406.08 |
| 7,310,425 B1 * | 12/2007 | Benesty | H04M 9/082 379/406.08 |
| 7,403,609 B2 * | 7/2008 | Hirai | H04R 3/02 370/286 |
| 7,477,735 B2 * | 1/2009 | Marton | H04M 9/08 379/406.04 |
| 8,130,969 B2 * | 3/2012 | Buck | H04M 9/082 381/66 |
| 2005/0213747 A1 * | 9/2005 | Popovich | H04M 9/08 379/406.03 |
| 2008/0085009 A1 * | 4/2008 | Merks | H04M 9/082 381/66 |
| 2011/0311064 A1 * | 12/2011 | Teutsch | H04M 9/082 381/26 |
| 2012/0170755 A1 * | 7/2012 | Jonsson | H04M 9/082 381/1 |
| 2013/0216056 A1 * | 8/2013 | Thyssen | H04M 9/082 381/66 |
| 2014/0169568 A1 * | 6/2014 | Li | H04R 5/04 381/17 |
| 2015/0030172 A1 * | 1/2015 | Gaensler | H04R 3/02 381/71.2 |

* cited by examiner

STEREO ECHO SUPPRESSING DEVICE, ECHO SUPPRESSING DEVICE, STEREO ECHO SUPPRESSING METHOD, AND NON-TRANSITORY COMPUTER-READABLE RECORDING MEDIUM STORING STEREO ECHO SUPPRESSING PROGRAM

CROSS REFERENCE TO RELATED APPLICATION(S)

This application is based upon and claims benefit of priority from Japanese Patent Application No. 2014-173072, filed on Aug. 27, 2014, the entire contents of which are incorporated herein by reference.

BACKGROUND

The present invention relates to stereo echo suppressing devices, echo suppressing devices, stereo echo suppressing methods, and non-transitory computer-readable recording medium storing stereo echo suppressing program. For example, the present invention can be applied to a stereo echo suppressing device used for a teleconferencing system and an audio conferencing system.

For example, in an amplifying call system such as the teleconferencing system and the audio conferencing system, sounds emitted from a loudspeaker (here, the "sound" includes acoustic, voice, and the like) input to a microphone as acoustic echo signals and return to a talker side. The acoustic echo signals seriously hinder telephone calls. Therefore, many studies and developments on acoustic echo suppressing methods have been performed.

One of techniques for suppressing acoustic echo signals includes a technique using an echo canceller. The echo canceller is a device for suppressing an acoustic echo signal by estimating echo path characteristics (spatial transfer characteristics) between a loudspeaker and a microphone with an adaptive filter; calculating an estimation echo signal by convolving a far-end output signal with the echo path characteristics estimated; and subtracting the estimation echo signal from an near-end input signal.

The echo canceller tends to be composed of a single loudspeaker. However, the teleconferencing system, the audio conferencing system, or the like each tends to be composed of two loudspeakers so as to output stereo signals. "ISCIE Journal 'Systems, Control and Information', vol. 46, No. 12, pp. 724-732 (2002), Stereophonic Acoustic Echo Cancellation: An Overview and Solutions, Shoji MAKINO, and Suehiro SHIMAUCHI" (Non-Patent Literature 1) proposes a stereo echo canceller that causes an echo canceller to be compatible with stereo output and suppresses acoustic echo signals in such case.

SUMMARY

However, by the configuration in which the existing echo canceller is compatible with stereo output, there is a coefficient indeterminacy problem that true echo path characteristics are not estimated when there is a correlation between a Left channel and a Right channel of far-end signals inputted to the adaptive filter. The coefficient indeterminacy problem is caused by existence of an infinite number of solutions when the adaptive filter is updated so as to reduce errors in an adaptable algorithm.

Although Non-Patent Literature 1 also discloses a technique for solving the problem, a technology described in Non-Patent Literature 1 adds non-correlated noises and cross-correlation variations to far-end signals. Therefore, there is a new problem that the far-end signals themselves are distorted and deterioration in sound quality and telephone speech quality occurs.

Thus, use of a stereo echo suppressing device that suppresses stereo echoes in a frequency domain without using the adaptable algorithm is also proposed. Since the adaptable algorithm is not used in the stereo echo suppression process, there is no coefficient indeterminacy problem.

However, when a signal in which a Left channel and a Right channel of a far-end signal are correlated is inputted, despite almost all acoustic echo signals are suppressed in a first suppression process, correlated acoustic echo signals are also suppressed in a second suppression process. Accordingly, too much suppression (too much subtraction) may occur.

Accordingly, there have been desired a stereo echo suppressing device, echo suppressing device, stereo echo suppressing method, and stereo echo suppressing program that prevent too much suppression and suppress acoustic echo signals stably even when a signal in which a Left channel and a Right channel of a far-end signal are correlated is inputted.

Accordingly, the embodiments of the present invention have configurations as described below.

According to a first embodiment of the present invention, there is provided a stereo echo suppressing device that suppresses an acoustic echo signal based on a near-end input signal and far-end signals of two channels as a stereo signal, the stereo echo suppressing device including: (1) a first far-end signal amplitude spectrum calculating unit configured to calculate an amplitude spectrum of a first far-end signal by transforming the inputted first far-end signal into a spectrum in a frequency domain; (2) a second far-end signal amplitude spectrum calculating unit configured to calculate an amplitude spectrum of a second far-end signal by transforming the inputted second far-end signal into a spectrum in a frequency domain; (3) a near-end input signal amplitude spectrum calculating unit configured to calculate an amplitude spectrum of the near-end input signal by transforming the inputted near-end input signal into a spectrum in a frequency domain; (4) a first estimation echo signal estimating unit configured to estimate an amplitude spectrum of a first estimation echo signal by multiplying a stored first echo path characteristic by the amplitude spectrum of the first far-end signal; (5) a second estimation echo signal estimating unit configured to estimate an amplitude spectrum of a second estimation echo signal by multiplying a stored second echo path characteristic by the amplitude spectrum of the second far-end signal; (6) a first echo suppressing unit configured to suppress the acoustic echo signal superimposed on the near-end input signal by calculating a first echo suppression gain with the amplitude spectrum of the first estimation echo signal and the amplitude spectrum of the near-end input signal; (7) a second echo suppressing unit configured to suppress the acoustic echo signal superimposed on the near-end input signal by calculating a second echo suppression gain according to a correlation result between the amplitude spectrum of the first estimation echo signal and the amplitude spectrum of the second estimation echo signal; (8) a first echo path characteristic updating unit configured to calculate and update the echo path characteristic of the first far-end signal by using the amplitude spectrum of the first far-end signal and the amplitude spectrum of the near-end input signal; and (9) a second echo path characteristic updating unit configured to calculate and update the echo path characteristic of the second far-end signal by using the amplitude spectrum of the second far-end signal and the amplitude spectrum of the near-end input signal.

According to a second embodiment of the present invention, there is provided an echo suppressing device including: one or a plurality of the stereo echo suppressing device as described above, in the echo suppressing device the respective near-end input signals are inputted from one or a plurality of microphones.

According to a third embodiment of the present invention, there is provided a stereo echo suppressing method of suppressing an acoustic echo signal based on a near-end input signal and far-end signals of two channels as a stereo signal, the stereo echo suppressing method including: (1) calculating an amplitude spectrum of a first far-end signal by a first far-end signal amplitude spectrum calculating unit, by transforming the inputted first far-end signal into a spectrum in a frequency domain; (2) calculating an amplitude spectrum of a second far-end signal by a second far-end signal amplitude spectrum calculating unit, by transforming the inputted second far-end signal into a spectrum in a frequency domain; (3) calculating an amplitude spectrum of the near-end input signal by a near-end input signal amplitude spectrum calculating unit, by transforming the inputted near-end input signal into a spectrum in a frequency domain; (4) estimating an amplitude spectrum of a first estimation echo signal by a first estimation echo signal estimating unit, by multiplying a stored echo path characteristic of the first far-end signal by the amplitude spectrum of the first far-end signal; (5) estimating an amplitude spectrum of a second estimation echo signal by a second estimation echo signal estimating unit, by multiplying a stored echo path characteristic of the second far-end signal by the amplitude spectrum of the second far-end signal; (6) suppressing the acoustic echo signal superimposed on the near-end input signal by a first echo suppressing unit, by calculating a first echo suppression gain by using the amplitude spectrum of the first estimation echo signal and the amplitude spectrum of the near-end input signal; (7) suppressing the acoustic echo signal superimposed on the near-end input signal by a second echo suppressing unit, by calculating a second echo suppression gain according to a correlation result between the amplitude spectrum of the first estimation echo signal and the amplitude spectrum of the second estimation echo signal; (8) calculating and updating the echo path characteristic of the first far-end signal by a first echo path characteristic updating unit, by using the amplitude spectrum of the first far-end signal and the amplitude spectrum of the near-end input signal; and (9) calculating and updating the echo path characteristic of the second far-end signal by a second echo path characteristic updating unit, by using the amplitude spectrum of the second far-end signal and the amplitude spectrum of the near-end input signal.

According to a fourth embodiment of the present invention, there is provided a non-transitory computer-readable recording medium storing a stereo echo suppressing program that suppresses an acoustic echo signal based on a near-end input signal and far-end signals of two channels as a stereo signal, the stereo echo suppressing program causing a computer to function as: (1) a first far-end signal amplitude spectrum calculating unit configured to calculate an amplitude spectrum of a first far-end signal by transforming the inputted first far-end signal into a spectrum in a frequency domain; (2) a second far-end signal amplitude spectrum calculating unit configured to calculate an amplitude spectrum of a second far-end signal by transforming the inputted second far-end signal into a spectrum in a frequency domain; (3) a near-end input signal amplitude spectrum calculating unit configured to calculate an amplitude spectrum of the near-end input signal by transforming an inputted near-end input signal into a spectrum in a frequency domain; (4) a first estimation echo signal estimating unit configured to calculate an amplitude spectrum of a first estimation echo signal by multiplying a stored echo path characteristic of the first far-end signal by the amplitude spectrum of the first far-end signal; (5) a second estimation echo signal estimating unit configured to calculate an amplitude spectrum of a second estimation echo signal by multiplying a stored echo path characteristic of the second far-end signal by the amplitude spectrum of the second far-end signal; (6) a first echo suppressing unit configured to suppress the acoustic echo signal superimposed on the near-end input signal by calculating a first echo suppression gain by using the amplitude spectrum of the first estimation echo signal and the amplitude spectrum of the near-end input signal; (7) a second echo suppressing unit configured to suppress the acoustic echo signal superimposed on the near-end input signal by calculating a second echo suppression gain according to a correlation result between the amplitude spectrum of the first estimation echo signal and the amplitude spectrum of the second estimation echo signal; (8) a first echo path characteristic updating unit configured to calculate and update the echo path characteristic of the first far-end signal by using the amplitude spectrum of the first far-end signal and the amplitude spectrum of the near-end input signal; and (9) a second echo path characteristic updating unit configured to calculate and update the echo path characteristic of the second far-end signal by using the amplitude spectrum of the second far-end signal and the amplitude spectrum of the near-end input signal.

According to the embodiments of the present invention, it is possible to suppress acoustic echo signals without occurring the coefficient indeterminacy problem even when a signal in which a Left channel and a Right channel of a far-end signal are correlated is inputted.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

Hereinafter, details of a stereo echo suppressing device, a stereo echo suppressing method, and a stereo echo suppressing program according to the first embodiment of the present invention are explained with reference to the drawings.

In the first embodiment, the present embodiment is applied to an echo suppressing device, method, and program, the echo suppressing device being mounted on a voice transmitting and receiving device in the amplifying call system such as the teleconferencing system or the audio conferencing system.

(A-1) Configuration in First Embodiment

Figure 1:
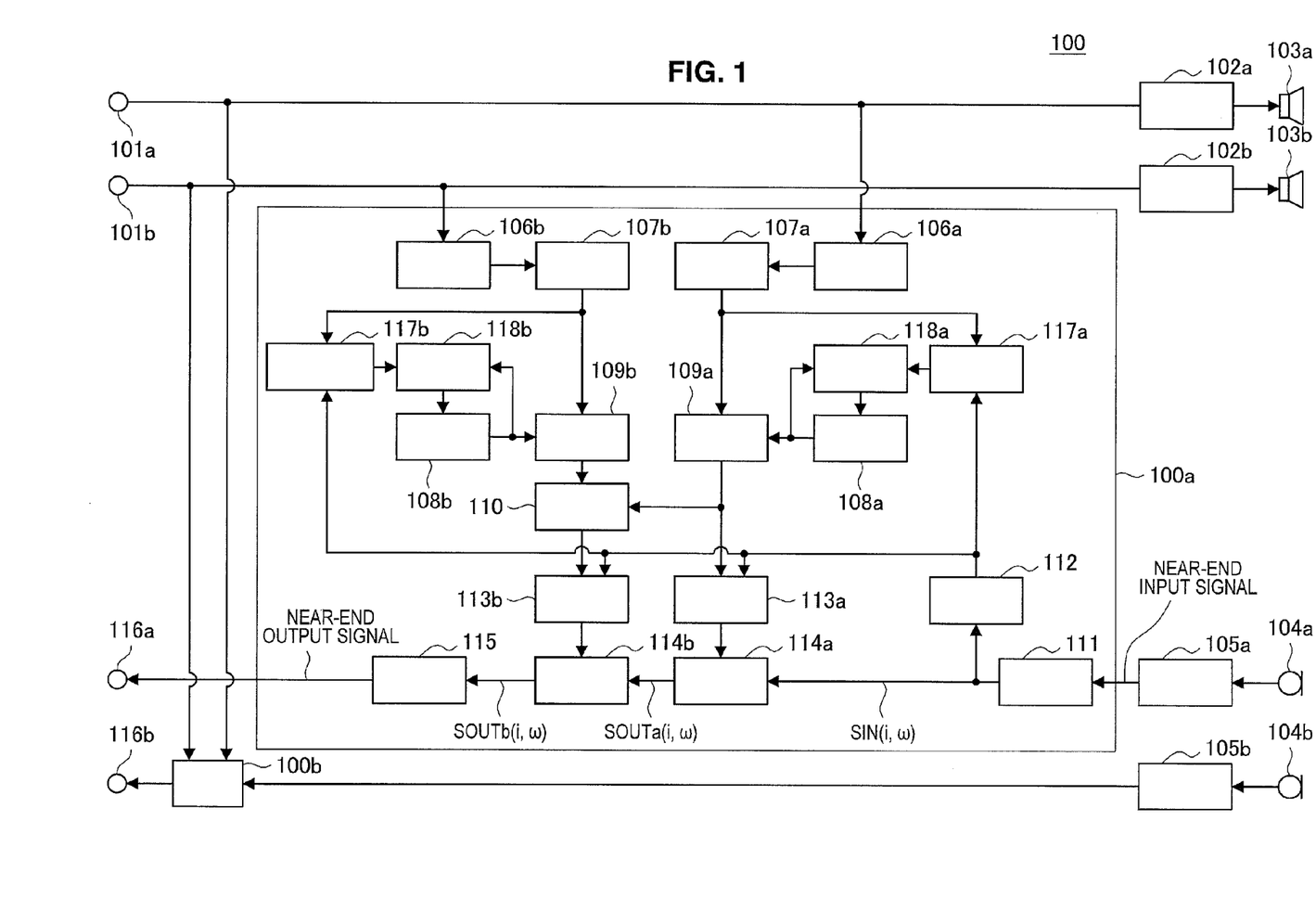
FIG. 1 is a block diagram showing a configuration of a stereo echo suppressing device according to a first embodiment.

FIG. 1 is a block diagram showing a configuration of the echo suppressing device according to the first embodiment.

An echo suppressing device 100 according to the first embodiment includes two microphones and two loudspeakers, and is mounted on the voice transmitting and receiving device that outputs stereo signals from two loudspeakers.

In this embodiment, a case in which stereo signals of two channels (for example, Left channel and Right channel) are inputted to the echo suppressing device 100 as far-end signals, and the two loudspeakers output the stereo signals of the two channel is exemplified. However, the number of channels is not limited.

Hereinafter, structural elements that performs a process using one sound signal among stereo sound signals input to the two microphones are distinguished by reference signs with "a" at the end, and structural elements that performs a process using the other sound signal are distinguished by reference signs with "b" at the end.

With reference to FIG. 1, the echo suppressing device 100 according to the first embodiment includes far-end signal input terminals 101a and 101b, digital-analog (DA) converters 102a and 102b, loudspeakers 103a and 103b, microphones 104a and 104b, analog-digital (AD) converters 105a and 105b, stereo echo suppressing devices 100a and 100b, and near-end output terminals 116a and 116b.

The stereo echo suppressing devices 100a and 100b each include far-end signal frequency domain transform units 106a and 106b, far-end signal amplitude spectrum calculating units 107a and 107b, echo path characteristic storage units 108a and 108b, estimation echo signal calculating units 109a and 109b, a correlation component rejecting unit 110, a near-end input signal frequency domain transform unit 111, a near-end input signal amplitude spectrum calculating unit 112, echo suppression gain calculating units 113a and 113b, echo suppression processing units 114a and 114b, a near-end output signal time domain transform unit 115, echo path characteristic calculating units 117a and 117b, and echo path characteristic updating units 118a and 118b.

Note that, the "first echo suppressing unit" described in claims includes the echo suppression gain calculating unit 113a and the echo suppression processing unit 114a, and the "second echo suppressing unit" described in claims includes the correlation component rejecting unit 110, the echo suppression gain calculating unit 113b and the echo suppression processing unit 114b.

The stereo echo suppressing devices 100a and 100b perform stereo echo suppression processes on near-end input signals inputted from the respective microphones 104a and 104b. Even when far-end signals transfer as acoustic echo signals in a space at a near-end side and are inputted to the microphones 104a and 104b, the stereo echo suppressing devices 100a and 100b preform the stereo echo suppression processes on near-end input signals and appropriately suppress the acoustic echo signals.

The stereo echo suppressing devices 100a and 100b may be, for example, constructed as dedicated boards, may be implemented by writing echo suppressing programs to digital signal processors (DSPs), or may be implemented by software (stereo echo suppressing programs) executed by CPUs. Functions of the stereo echo suppressing devices 100a and 100b are shown in FIG. 1. All structural elements of the stereo echo suppressing devices 100a and 100b may be constructed by hardware, or a part of the structural elements may be constructed by software (program).

Note that, the stereo echo suppressing devices 100a and 100b have the same configurations. Accordingly, hereinafter, only the stereo echo suppressing device 100a is explained, and repeated explanation of the stereo echo suppressing device 100b is omitted.

The far-end signal input terminals 101a and 101b are connected to, for example, a network such as an Internet Protocol (IP) network or radio waves or the like of a wireless network such as a mobile phone. Via a connected line, far-end signals at a far-end side (partner side) are inputted to the far-end signal input terminals 101a and 101b.

Far-end signals inputted to the far-end signal input terminals 101a and 101b are outputted to the DA converters 102a and 102b. The DA converters 102a and 102b convert the far-end signals from digital sound signals to analog sound signals. Subsequently, the signals are outputted to a near-end side via the loudspeakers 103a and 103b.

On the other hand, the microphones 104a and 104b receive analog sound signals superimposed with environmental sounds at the near-end side, acoustic echo signals (for example, analog sound signals outputted from the loudspeakers 103a and 103b, transferring in the space at the near-end side, and inputting) and sound signals such as the talker's speech at the near-end side.

The AD converters 105a and 105b convert the analog sound signals provided from the microphones 104a and 104b into digital sound signals. Subsequently, the digital sound signals are inputted to the stereo echo suppressing device 100 as near-end input signals.

The far-end signal frequency domain transform units 106a and 106b each acquire the far-end signals inputted to the far-end signal input terminals 101a and 101b, transform the respective far-end signals in a time domain into spectrums in a frequency domain by using a fast Fourier transform (FFT) or the like, and output frequency spectrums of the far-end signals to the far-end signal amplitude spectrum calculating units 107a and 107b.

The far-end signal amplitude spectrum calculating units 107a and 107b calculate amplitude spectrums of the far-end signals on the basis of the frequency spectrums of the far-end signals, and output the calculated amplitude spectrums of the far-end signals to the estimation echo signal calculating units 109a and 109b and the echo path characteristic calculating units 117a and 117b.

The echo path characteristic storage units 108a and 108b store echo path characteristics, and outputs the stored echo path characteristics to the estimation echo signal calculating units 109a and 109b and the echo path characteristic updating units 118a and 118b.

The estimation echo signal calculating units 109a and 109b calculate amplitude spectrums of estimation echo signals by multiplying the echo path characteristics by the amplitude spectrums of the far-end signals. The estimation echo signal calculating unit 109a outputs the calculated amplitude spectrum of the estimation echo signal to the correlation component rejecting unit 110 and the echo suppression gain calculating unit 113a. The estimation echo signal calculating unit 109b outputs the calculated estimation echo signal to the correlation component rejecting unit 110.

The correlation component rejecting unit 110 rejects a correlation component of the amplitude spectrum of the estimation echo signal from the estimation echo signal calculating unit 109a included in the amplitude spectrum of the estimation echo signal from the estimation echo signal calculating unit 109b. The correlation component rejecting unit 110 outputs, to the echo suppression gain calculating unit 113b, amplitude spectrum of the estimation echo signal from which the correlation component has been rejected.

The near-end input signal frequency domain transform unit 111 acquires a near-end input signal outputted from the AD converter 105a, and converts the near-end input signal in a time domain into a spectrum in a frequency domain by using the FFT or the like, and outputs the frequency spectrum of the near-end input signal to the near-end input signal amplitude spectrum calculating unit 112 and the echo suppression processing unit 114a.

The near-end input signal amplitude spectrum calculating unit 112 calculates an amplitude spectrum of the near-end input signal on the basis of the frequency spectrum of the near-end input signal, and outputs the calculated amplitude spectrum of the near-end input signal to the echo suppression gain calculating units 113a and 113b and the echo path characteristic calculating units 117a and 117b.

The echo suppression gain calculating unit 113a calculates an echo suppression gain for suppressing the acoustic echo signal of the loudspeaker 103a superimposed on the near-end input signal, by using the amplitude spectrum of the near-end input signal from the near-end input signal amplitude spectrum calculating unit 112 and the amplitude spectrum of the estimation echo signal from the estimation echo signal calculating unit 109a. The echo suppression gain calculating unit 113a outputs the calculated echo suppression gain to the echo suppression processing unit 114a.

The echo suppression gain calculating unit 113b calculates an echo suppression gain for suppressing the acoustic echo signal of the loudspeaker 103b from which the correlation component has been rejected superimposed on the near-end input signal, by using the amplitude spectrum of the near-end input signal from the near-end input signal amplitude spectrum calculating unit 112 and the amplitude spectrum of the estimation echo signal from which the correlation component has been rejected by the correlation component rejecting unit 110. The echo suppression gain calculating unit 113b outputs the calculated echo suppression gain to the echo suppression processing unit 114b.

The echo suppression processing unit 114a calculates a frequency spectrum suppressing the acoustic echo signal of the loudspeaker 103a superimposed on the near-end input signal by multiplying the echo suppression gain from the echo suppression gain calculating unit 113a by the frequency spectrum of the near-end input signal from the near-end input signal frequency domain transform unit 111. The echo suppression processing unit 114a outputs the frequency spectrum suppressing the acoustic echo signal to the echo suppression processing unit 114b.

The echo suppression processing unit 114b calculates a frequency spectrum suppressing the acoustic echo signal of the loudspeaker 103b from which the correlation component has been rejected superimposed on the near-end input signal by multiplying the echo suppression gain from the echo suppression gain calculating unit 113b by the frequency spectrum from the echo suppression processing unit 114a. The echo suppression processing unit 114b outputs the frequency spectrum suppressing the acoustic echo signal to the near-end output signal time domain transform unit 115, as a frequency spectrum of a near-end output signal.

The near-end output signal time domain transform unit 115 transforms the frequency spectrum of the near-end output signal in a frequency domain into a digital sound signal in a time domain by using an inverse fast Fourier transform (IFFT) or the like, and outputs the near-end output signal to the near-end signal output terminal 116.

The near-end signal output terminal 116 is connected to, for example, a network such as an IP network or radio waves or the like of a wireless network such as a mobile phone. Via a connected line, the near-end signal is outputted to the far-end side.

The echo path characteristic calculating units 117a and 117b calculate echo path characteristics of a current frame on the basis of the amplitude spectrums of the far-end signals from the far-end signal amplitude spectrum calculating units 107a and 107b and the amplitude spectrum of the near-end input signal from the near-end input signal amplitude spectrum calculating unit 112, and output the calculated echo path characteristics of the current frame to the echo path characteristic updating units 118a and 118b.

The echo path characteristic updating units 118a and 118b update the echo path characteristics on the basis of the echo path characteristics of the current frame calculated by the echo path characteristic calculating units 117a and 117b and the echo path characteristics stored by the echo path characteristic storage units 108a and 108b, and the echo path characteristic storage unit 108a and 108b store the updated echo path characteristics.

(A-2) Operation in First Embodiment

Next, details of operation of echo suppression process in the echo suppressing device 100 according to the first embodiment of the present invention are explained. The operation is also explained by using the stereo echo suppressing device 100a as a representative of the stereo echo suppressing devices 100a and 100b.

First, after the operation of the echo suppressing device 100 is started, far-end signals at the far-end side are inputted to the far-end signal input terminals 101a and 101b via a connected line connected to a network such as an IP network or radio waves or the like of a wireless network such as a mobile phone.

Far-end signals inputted to the far-end signal input terminals 101a and 101b are outputted to the DA converters 102a and 102b. The DA converters 102a and 102b convert the far-end signals from digital sound signals to analog sound signals. Subsequently, the signals are outputted to a near-end side via the loudspeakers 103a and 103b.

On the other hand, the microphones 104 receive analog sound signals superimposed with the talker's speech at the near end, environmental sounds at the near-end, and acoustic echo signals (for example, analog sound signals outputted from the loudspeakers 103a and 103b, transferring in the space at the near-end side, and inputting). The AD converter 105 converts the analog sound signals into digital sound signals. Subsequently, the digital sound signals are inputted to the stereo echo suppressing device 100 as near-end input signals.

The far-end signal frequency domain transform units 106a and 106b transform the far-end signals in a time domain into spectrums in a frequency domain by using the FFT or the like, and outputs frequency spectrums ROUTa$(i,\omega)$ and ROUTb$(i,\omega)$ of the transformed far-end signals to the far-end signal amplitude spectrum calculating units 107a and 107b.

The far-end signal amplitude spectrum calculating units 107a and 107b calculate amplitude spectrums |ROUTa(i,ω)| and |ROUTb(i,ω)| of the far-end signals in accordance with Equations (1) and (2) using the frequency spectrums ROUTa (i,ω) and ROUTb(i,ω).

$$|ROUTa(i,\Psi)|= \sqrt{(ROUTa\_real(i,\omega))^2+(ROUTa\_image(i,\omega))^2} \quad (1)$$

$$|ROUTb(i,\omega)|= \sqrt{(ROUTb\_real(i,\omega))^2+(ROUTb\_image(i,\omega))^2} \quad (2)$$

Where i represents a frame, ω represents a frequency bin, ROUTa_real(i,ω) and ROUTa_image(i,ω) represent a real part and an imaginary part in the frequency spectrum ROUTa(i,ω) of a far-end signal of the frequency bin ω in the frame i, ROUTb_real(i,ω) and ROUTb_image(i,ω) represent a real part and an imaginary part in the frequency spectrum ROUTb(i,ω) of the far-end signal of the frequency bin ω in the frame i, and the frequency spectrums ROUTa (i,ω) and ROUTb(i,ω) of the far-end signal are represented by Equations (3) and (4).

$$ROUTa(i,\omega)=ROUTa\_real(i,\omega)+j\cdot ROUTa\_image(i,\omega) \quad (3)$$

$$ROUTb(i,\omega)=ROUTb\_real(i,\omega)+j\cdot ROUTb\_image(i,\omega) \quad (4)$$

Where j in Equations (3) and (4) represents an imaginary number. The frequency spectrums |ROUTa(i,ω)| and |ROUTb(i,ω)| of the far-end signals calculated by the far-end signal amplitude spectrum calculating units 107a and 107b are outputted to the estimation echo signal calculating units 109a and 109b and the echo path characteristic calculating units 117a and 117b.

The estimation echo signal calculating units 109a and 109b calculate amplitude spectrums |ECHOa(i,ω)| and |ECHOb(i,ω)| of the estimation echo signals in accordance with Equations (5) and (6) using the echo path characteristics |Ha(i−1,ω)| and |Hb(i−1,ω)| stored in the echo path characteristic storage units 108a and 108b and the amplitude spectrums |ROUTa(i,ω)| and |ROUTb(i,ω)| of the far-end signals.

$$|ECHOa(i,\omega)|=|Ha(i-1,\omega)|\cdot|ROUTa(i,\omega)| \quad (5)$$

$$|ECHOb(i,\omega)|=|Hb(i-1,\omega)|\cdot|ROUTb(i,\omega)| \quad (6)$$

In Equations (5) an (6), the amplitude spectrums |ROUTa (i,ω)| and |ROUTb(i,ω)| of the far-end signals are multiplied by frequency bins corresponding to the echo path characteristics |Ha(i−1,ω)| and |Hb(i−1,ω)| stored in the echo path characteristic storage unit 110, to obtain the amplitude spectrums |ECHOa(i,ω)| and |ECHOb(i,ω)| of estimation echo signals of the frequency bins. Subsequently, the amplitude spectrum |ECHOa(i,ω)| of the estimation echo signal obtained by the estimation echo signal calculating unit 109a is outputted to the echo suppression gain calculating unit 113a and the correlation component rejecting unit 110. The amplitude spectrum |ECHOb(i,ω)| of the estimation echo signal obtained by the estimation echo signal calculating unit 109b is outputted to the correlation component rejecting unit 110.

In accordance with Equation (7), the correlation component rejecting unit 110 calculates an amplitude spectrum |ECHO_corr_rejection(i,ω)| from which a correlation component between |ECHOa(i,ω)| and |ECHOb(i,ω)| included in |ECHOb(i,ω)| has been rejected.

$$|ECHO\_corr\_rejection(i,\omega)| = \begin{cases} |ECHOb(i,\omega)| - |ECHOa(i,\omega)| & (|ECHOb(i,\omega)| - |ECHOa(i,\omega)| > 0) \\ 0 & (\text{otherwise}) \end{cases} \quad (7)$$

The correlation component rejecting unit 110 outputs the amplitude spectrum |ECHO_corr_rejection(i,ω)| from which the correlation component has been rejected, to the echo suppression gain calculating unit 113b.

On the other hand, the near-end input signal frequency domain transform unit 111 transforms the near-end input signal in a time domain into a spectrum in a frequency domain by using the FFT or the like, and outputs a frequency spectrum SIN(i,ω) of the transformed near-end input signal to the near-end input signal amplitude spectrum calculating unit 112 and the echo suppression processing unit 114a.

The near-end input signal amplitude spectrum calculating unit 112 calculates an amplitude spectrum |SIN(i,ω)| of the near-end input signal in accordance with Equation (8) using the frequency spectrum SIN(i,ω) of the near-end input signal.

$$|SIN(i,\omega)|=\sqrt{(SIN\_real(i,\omega))^2+(SIN\_image(i,\omega))^2} \quad (8)$$

Where SIN_real(i,ω) and SIN_image(i,ω) represent a real part and an imaginary part in the frequency spectrum of the near-end input signal of the frequency bin ω in the frame i, and the frequency spectrum SIN(i,ω) of the near-end input signal is represented by Equation (9).

$$SIN(i,\omega)=SIN\_real(i,\omega)+j\cdot SIN\_image(i,\omega) \quad (9)$$

Where j in Equation (9) represents an imaginary number. Subsequently, the amplitude spectrum |SIN(i,ω)| of the near-end input signal calculated by the near-end input signal amplitude spectrum calculating unit 112 is outputted to the echo suppression gain calculating units 113a and 113b and the echo path characteristic calculating units 117a and 117b.

The echo suppression gain calculating unit 113a acquires the amplitude spectrum |SIN(i,ω)| of the near-end input signal and the amplitude spectrum |ECHOa(i,ω)| of the estimation echo signal, and calculates an echo suppression gain Ga(i,ω) by using Equation (10).

$$Ga(i,\omega) = \frac{|SIN(i,\omega)| - |ECHOa(i,\omega)|}{|SIN(i,\omega)|} \quad (10)$$

For each frequency bin, Equation (10) divides, by the amplitude spectrum |SIN(i,ω)| of the near-end input signal, an amplitude spectrum obtained by subtracting the amplitude spectrum |ECHOa(i,ω)| of the estimation echo signal from the amplitude spectrum |SIN(i,ω)| of the near-end input signal, to obtain the echo suppression gain Ga(i,ω). The echo suppression gain Ga(i,ω) obtained by the echo suppression gain calculating unit 113a is outputted to the echo suppression processing unit 114a.

The echo suppression gain calculating unit 113b acquires the amplitude spectrum |SIN(i,ω)| of the near-end input signal and the amplitude spectrum |ECHO_corr_rejection(i,ω)| of the estimation echo signal from which the correlation component between |ECHOa(i,ω)| and |ECHOb(i,ω)| included in |ECHOb(i,ω)| has been rejected, and calculates an echo suppression gain Gb(i,ω) by using Equation (11).

$$Gb(i,\omega) = \frac{|SIN(i,\omega)| - |ECHO\_corr\_rejection(i,\omega)|}{|SIN(i,\omega)|} \quad (11)$$

For each frequency bin, Equation (11) divides, by the amplitude spectrum |SIN(i,ω)| of the near-end input signal, an amplitude spectrum obtained by subtracting the amplitude spectrum |ECHO_corr_rejection(i,ω)| of the estimation echo signal from the amplitude spectrum |SIN(i,ω)| of the near-end input signal, to obtain the echo suppression gain Gb(i,ω) which the correlation component between |ECHOa(i,ω)| and |ECHOb(i,ω)| included in |ECHOb(i,ω)| has been rejected. The echo suppression gain Gb(i,ω) obtained by the echo suppression gain calculating unit 113b is outputted to the echo suppression processing unit 114b.

The echo suppression processing unit 114a suppresses an acoustic echo signal superimposed on the spectrum SIN(i,ω) of the near-end input signal in accordance with Equations (12) and (13) using the spectrum SIN(i,ω) of the near-end input signal and the echo suppression gain Ga(i,ω).

$$SOUTa\_real(i,\omega) = Ga(i,\omega) \cdot SIN\_real(i,\omega) \quad (12)$$

$$SOUTa\_image(i,\omega) = Ga(i,\omega) \cdot SIN\_image(i,\omega) \quad (13)$$

Where SOUTa_real(i,ω) and SOUTa_image(i,ω) represent a real part and an imaginary part in the frequency spectrum of the near-end output signal of the frequency bin ω in the frame i, and the frequency spectrum SOUTa(i,ω) of the near-end output signal is represented by an Equation (14) as follows.

$$SOUTa(i,\omega) = SOUTa\_real(i,\omega) + j \cdot SOUTa\_image(i,\omega) \quad (14)$$

Where j in Equation (14) represents an imaginary number. Equation (12) and Equation (13) multiply a real part and an imaginary part in the frequency spectrum by the echo suppression gain Ga(i,ω) for each frequency bin, to obtain a frequency spectrum SOUTa(i,ω) of the near-end output signal suppressing the acoustic echo signal. Subsequently, the frequency spectrum SOUTa(i,ω) of the near-end output signal suppressing the acoustic echo signal obtained by the echo suppression processing unit 114a is outputted to the echo suppression processing unit 114b.

The echo suppression processing unit 114b suppresses an acoustic echo signal superimposed on the spectrum SINb(i,ω) of the near-end input signal in accordance with Equations (15) and (16) using the spectrum SOUTa(i,ω) of the near-end output signal and the echo suppression gain Gb(i,ω).

$$SOUTb\_real(i,\omega) = Gb(i,\omega) \cdot SOUTa\_real(i,\omega) \quad (15)$$

$$SOUTb\_image(i,\omega) = Gb(i,\omega) \cdot SOUTa\_image(i,\omega) \quad (16)$$

Where SOUTb_real(i,ω) and SOUTb_image(i,ω) represent a real part and an imaginary part in the frequency spectrum of the near-end output signal of the frequency bin ω in the frame i, and the frequency spectrum SOUTb(i,ω) of the near-end output signal is represented by an Equation (17) as follows.

$$SOUTb(i,\omega) = SOUTb\_real(i,\omega) + j \cdot SOUTb\_image(i,\omega) \quad (17)$$

Where j in Equation (17) represents an imaginary number. Equation (15) and Equation (16) multiply a real part and an imaginary part in the frequency spectrum by the echo suppression gain Gb(i,ω) for each frequency bin, to obtain a frequency spectrum SOUTb(i,ω) of the near-end output signal suppressing the acoustic echo signal. Subsequently, the frequency spectrum SOUTb(i,ω) of the near-end output signal suppressing the acoustic echo signal obtained by the echo suppression processing unit 114b is outputted to the near-end output signal time domain transform unit 115.

The near-end output signal time domain transform unit 115 transforms the frequency spectrum SOUTb(i,ω) of the near-end output signal in a frequency domain into a digital sound signal in a time domain by using an IFFT or the like, and outputs the near-end output signal to the near-end signal output terminal 116a.

The near-end signal output terminal 116a is connected to, for example, a network such as an IP network or radio waves or the like of a wireless network such as a mobile phone. Via a connected line, the near-end output signal is outputted to the far-end side that is a call partner.

The echo path characteristic calculating units 117a and 117b calculate echo path characteristics |Ha1(i,ω)| and |Hb1(i,ω)| of the current frame by using the amplitude spectrums |ROUTa(i,ω)| and |ROUTb(i,ω)| of the far-end signals from the far-end signal amplitude spectrum calculating unit 107a and 107b and the amplitude spectrum |SIN(i,ω)| of the near-end output signal from the near-end signal amplitude spectrum calculating unit 112.

$$|Ha_1(i,\omega)| = \frac{|SIN(i,\omega)|}{|ROUTa(i,\omega)|} \quad (18)$$

$$|Hb_1(i,\omega)| = \frac{|SIN(i,\omega)|}{|ROUTb(i,\omega)|} \quad (19)$$

When the echo path characteristics |Ha1(i,ω)| and |Hb1(i,ω)| of the current frame are obtained, the echo path characteristics |Ha1(i,ω)| and |Hb1(i,ω)| of the current frame are outputted to the echo path characteristic updating units 118a and 118b.

The echo path characteristic updating units 118a and 118b read out the echo path characteristics |Ha1(i,ω)| and |Hb1(i,ω)| from the echo path characteristic calculating units 117a and 117b and the echo path characteristics |Ha(i−1,ω)| and |Hb(i−1,ω)| stored in the echo path characteristic storage units 108a and 108b, and update the echo path characteristics in accordance with Equation (20) and Equation (21) using |Ha(i−1,ω)| and |Ha1(i,ω)|, and |Hb(i−1,ω)| and |Hb1(i,ω)|.

$$|Ha(i,\omega)| = (1-c) \cdot |Ha_1(i,\omega)| + c \cdot |Ha(i-1,\omega)| \quad (20)$$

$$|Hb(i,\omega)| = (1-c) \cdot |Hb_1(i,\omega)| + c \cdot |Hb(i-1,\omega)| \quad (21)$$

Where c represents a coefficient of a time constant filter, and c is a value which is 0 or larger and 1 or smaller. In a case in which a user wants to slow the update of the echo path characteristics, it is desirable that c is close to 1 (for example, a value such as c=0.99). In a case in which a user wants to quicken the update, it is desirable that c is close to 0 (for example, a value such as c=0.01). The echo path characteristic updating units 118a and 118b output the updated echo path characteristics to the echo path characteristic storage units 108a and 108b and the echo path characteristic storage units 108a and 108b store the updated echo path characteristics.

(A-3) Effect of First Embodiment

As described above, according to the first embodiment, even when the correlated signals are inputted as far-end signals, distortion in sound signals due to too much subtraction can be prevented by rejecting a correlation component of the estimation echo signal, and an acoustic echo signal can be suppressed.

According to the first embodiment, the stereo echo suppression process is performed in a frequency domain without using the adaptable algorithm. Since the adaptable algorithm is not used in this way, the acoustic echo signal can be suppressed while there is no coefficient indeterminacy problem. In addition, according to the first embodiment, in the case of a signal in which a Left channel and a Right channel of a far-end signal are correlated, it is possible to prevent too much suppression while suppressing the acoustic echo signal in view of the correlation of the estimation echo signal estimated in the stereo echo suppression process.

(B) Second Embodiment

Next, with reference to the drawings, a stereo echo suppressing device, stereo echo suppressing method, and stereo echo suppressing program according to a second embodiment of the present invention are explained.

In the second embodiment, the present embodiment is also applied to a stereo echo suppressing device, method, and program, the stereo echo suppressing device being mounted on a voice transmitting and receiving device in the amplifying call system such as the teleconferencing system and the audio conferencing system.

(B-1) Configuration in Second Embodiment

Figure 2:
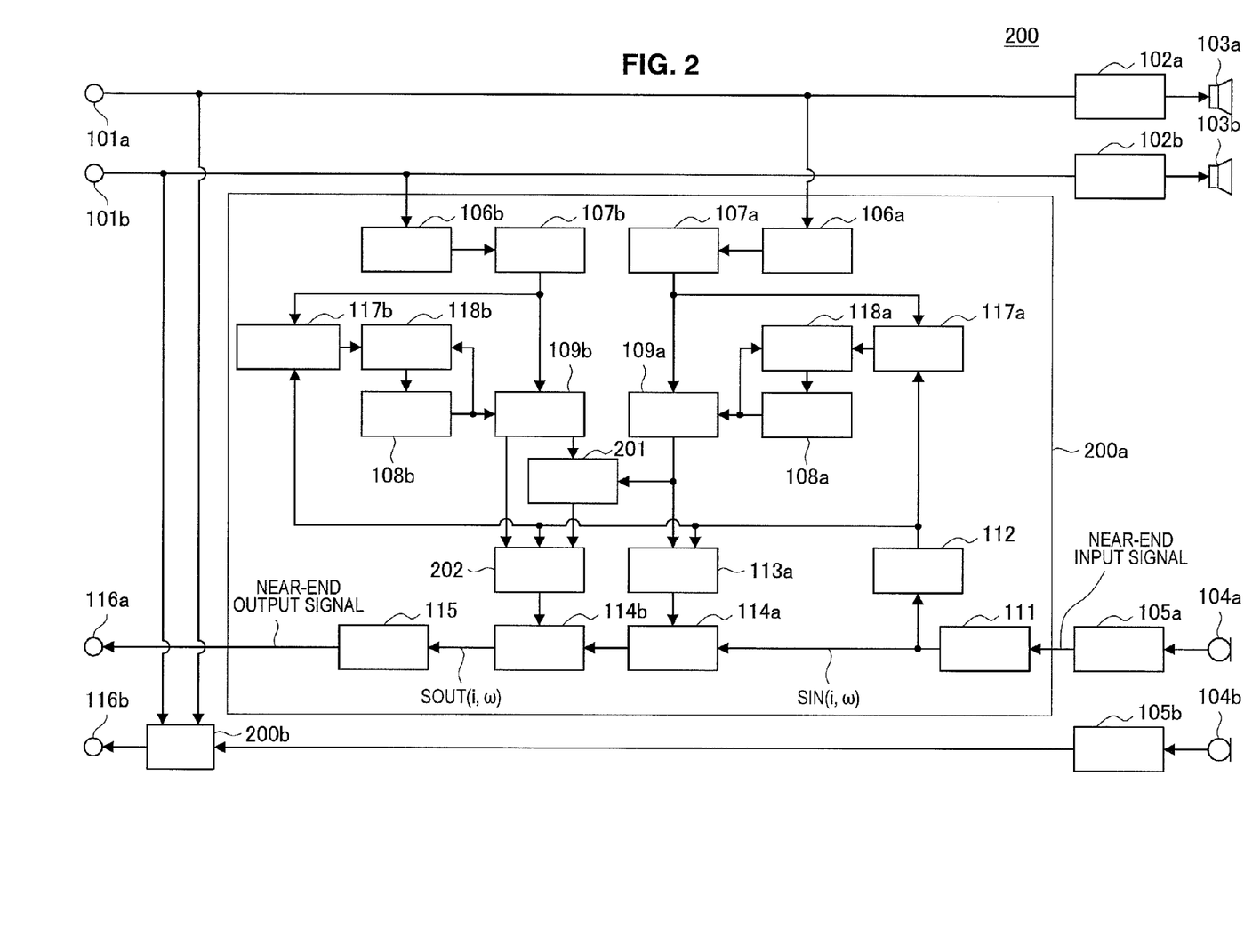
FIG. 2 is a block diagram showing a configuration of a stereo echo suppressing device according to a second embodiment.

FIG. 2 is a block diagram showing a configuration of an echo suppressing device 200 according to the second embodiment. With reference to FIG. 2, the echo suppressing device 200 according to the second embodiment includes the far-end signal input terminals 101a and 101b, the DA converters 102a and 102b, the loudspeakers 103a and 103b, the microphones 104a and 104b, the AD converters 105a and 105b, stereo echo suppressing devices 200a and 200b, and the near-end signal output terminals 116a and 116b.

The stereo echo suppressing devices 200a and 200b each include the far-end signal frequency domain transform units 106a and 106b, the far-end signal amplitude spectrum calculating units 107a and 107b, the echo path characteristic storage units 108a and 108b, the estimation echo signal calculating units 109a and 109b, the correlation calculating unit 201, the near-end input signal frequency domain transform unit 111, the near-end input signal amplitude spectrum calculating unit 112, the echo suppression gain calculating unit 113a, the correlation echo suppression gain calculating unit 202, the echo suppression processing units 114a and 114b, the near-end output signal time domain transform unit 115, the echo path characteristic calculating units 117a and 117b, and the echo path characteristic updating units 118a and 118b.

Note that, the "first echo suppressing unit" described in claims includes the echo suppression gain calculating unit 113a and the echo suppression processing unit 114a, and the "second echo suppressing unit" described in claims includes the correlation calculating unit 201, the correlation echo suppression gain calculating unit 202 and the echo suppression processing unit 114b.

The second embodiment is different from the echo suppressing device 100 according to the first embodiment in a calculation way of a correlation of an estimation echo signal and an echo suppression gain. The other structural elements according to the second embodiments are similar to or the same as the structural elements of the echo suppressing device 100 in FIG. 1 according to the first embodiment.

In other words, stereo echo suppressing devices 200a and 200b have configurations different from the stereo echo suppressing devices 100a and 100b according to the first embodiment, since the stereo echo suppressing devices 200a and 200b each include the correlation calculating unit 201 instead of the correlation component rejecting unit 110 explained in the first embodiment, and includes the correlation echo suppression gain calculating unit 202 instead of the echo suppression gain calculating unit 113b.

In FIG. 2, structural elements that have same structure or structure corresponding to the structural elements of the echo suppressing device 100 according to the first embodiment are denoted with the same reference numerals. Note that, a repeated explanation of structural elements that are the same as or corresponding to those of the first embodiment is omitted.

Note that, the stereo echo suppressing devices 200a and 200b have the same configurations also in the second embodiment. Accordingly, hereinafter, configuration of only the stereo echo suppressing device 200a is explained.

The correlation calculating unit 201 calculates a correlation between an amplitude spectrum of an estimation echo signal outputted from the estimation echo signal calculating unit 109a and an amplitude spectrum of an estimation echo signal outputted from the estimation echo signal calculating unit 109b. The correlation calculating unit 201 outputs a calculation result of the correlation to the correlation echo suppression gain calculating unit 202.

The correlation echo suppression gain calculating unit 202 calculates an echo suppression gain for suppressing the acoustic echo signal superimposed on the near-end input signal, by using the amplitude spectrum of the near-end input signal from the near-end input signal amplitude spectrum calculating unit 112, the amplitude spectrum of the estimation echo signal from the estimation echo signal calculating unit 109b, and the calculation result of the correlation by the correlation calculating unit 201. The correlation echo suppression gain calculating unit 202 outputs the calculated echo suppression gain to the echo suppression processing unit 114b.

(B-2) Operation in Second Embodiment

Next, details of operation of echo suppression process in the stereo echo suppressing device 200 according to the second embodiment of the present invention are explained. Here, details of processing operations of the correlation calculating unit 201 and the correlation echo suppression gain calculating unit 202 that are included in the stereo echo suppressing device 200a according to the second embodiment are explained.

For example, in accordance with Equation (22), the correlation calculating unit 201 in the stereo echo suppressing device 200 calculates a correlation between amplitude spectrums |ECHOa(i,ω)| and |ECHOb(i,ω)| of the estimation echo signal outputted from the estimation echo signal calculating units 109a and 109b.

$$\mathrm{Corr}(i) = \frac{\sum_{k=0}^{FFT\_LEN/2} (|ECHOa(i,k)| - aveECHOa)}{\sqrt{\sum_{k=0}^{FFT\_LEN/2} (|ECHOa(i,k)| - aveECHOa)^2} \cdot \sqrt{\sum_{k=0}^{FFT\_LEN/2} (|ECHOb(i,k)| - aveECHOb)^2}} \quad (22)$$

In Equation (22), Corr(i) represents a correlation coefficient, and FFT_LEN represents FFT length. aveECHOa represents a frame average value of an amplitude spectrum of the estimation echo signal |ECHOa(i,ω)|, and aveECHOb represents a frame average value of the amplitude spectrum of the estimation echo signal |ECHOb(i,ω)|. For example, aveECHOa and aveECHOb can be obtained in accordance with Equation (23) and Equation (24), respectively.

$$aveECHOa = \frac{\sum_{k=0}^{FFT\_LEN/2} |ECHOa(i,k)|}{(FFT\_LEN/2)} \quad (23)$$

$$aveECHOb = \frac{\sum_{k=0}^{FFT\_LEN/2} |ECHOb(i,k)|}{(FFT\_LEN/2)} \quad (24)$$

After the correlation calculating unit 201 calculates a correlation coefficient Corr(i), the correlation coefficient Corr(i) is outputted to the correlation echo suppression gain calculating unit 202.

To the calculation way of a correlation performed by the correlation calculating unit 201, diverse methods can be applied. For example, the correlation calculating unit 201 may calculate a difference between the amplitude spectrums |ECHOa(i,ω)| and |ECHOb(i,ω)| of the estimation echo signal of the far-end signals for each frequency bin, and output a sum of the differences as the correlation coefficient Corr(i) to the correlation echo suppression gain calculating unit 202. In this case, when the sum of the differences is small, it is determined that there is a correlation. When the sum of the differences is large, it is determined that there is no correlation.

The correlation echo suppression gain calculating unit 202 acquires the amplitude spectrum |SIN(i,ω)| of the near-end input signal, the amplitude spectrum |ECHOb(i,ω)| of the estimation echo signal, and the correlation coefficient Corr(i), and calculates an echo suppression gain Gb(i,ω) by using Equations (25).

$$Gb(i,\omega) = \begin{cases} \frac{|SIN(i,\omega)| - |ECHOb(i,\omega)|}{|SIN(i,\omega)|} & (-TH < \text{Corr}(i) < TH) \\ gain & (\text{otherwise}) \end{cases} \quad (25)$$

Where TH represents a threshold and gain represents an echo suppression gain when there is a correlation. For each frequency bin, the upper equation of Equations (25) divides, by the amplitude spectrum |SIN(i,ω)| of the near-end input signal, an amplitude spectrum obtained by subtracting the amplitude spectrum |ECHOb(i,ω)| of the estimation echo signal from the amplitude spectrum |SIN(i,ω)| of the near-end input signal only in a case of a frame determined as no correlation from the correlation coefficient Corr(i), so as to obtain the echo suppression gain Gb(i,ω). In the second embodiment, the correlation coefficient Corr(i) is a value between −1 and 1. When Corr(i) is close to 1, there is a positive correlation. When Corr(i) is close to −1, there is a negative correlation. In the case when Corr(i) is close to 0, there is no correlation, then the echo suppression gain Gb(i,ω) represented by the upper Equation of Equations (25). For example, when TH=0.8 and gain=1.0, the echo suppression gain is 1.0 when there is a positive correlation or a negative correlation. The echo suppression gain Gb(i,ω) calculated by the echo suppression gain calculating unit 113b is outputted to the echo suppression processing unit 114b.

(B-3) Effect of Second Embodiment

As described above, according to the second embodiment, even when the correlated signals are inputted as far-end signals, in the case that t is determined that there is a correlation, too much subtraction does not occur in a second subtraction after the correlation of the estimation echo signal is calculated, it is possible to prevent distortion in sound signals due to too much subtraction while suppressing an acoustic echo signal.

(C) Another Embodiment

The diverse modified embodiments have been explained in the above-described embodiments. In addition, the present invention can be applied to a modified embodiment as follows.

(C-1) The case in which the echo suppressing device according to each of the above-described embodiments includes the two microphones has been explained. In addition, more microphones can be installed in the echo suppressing device according to each of the above-described embodiments.

Figure 3:
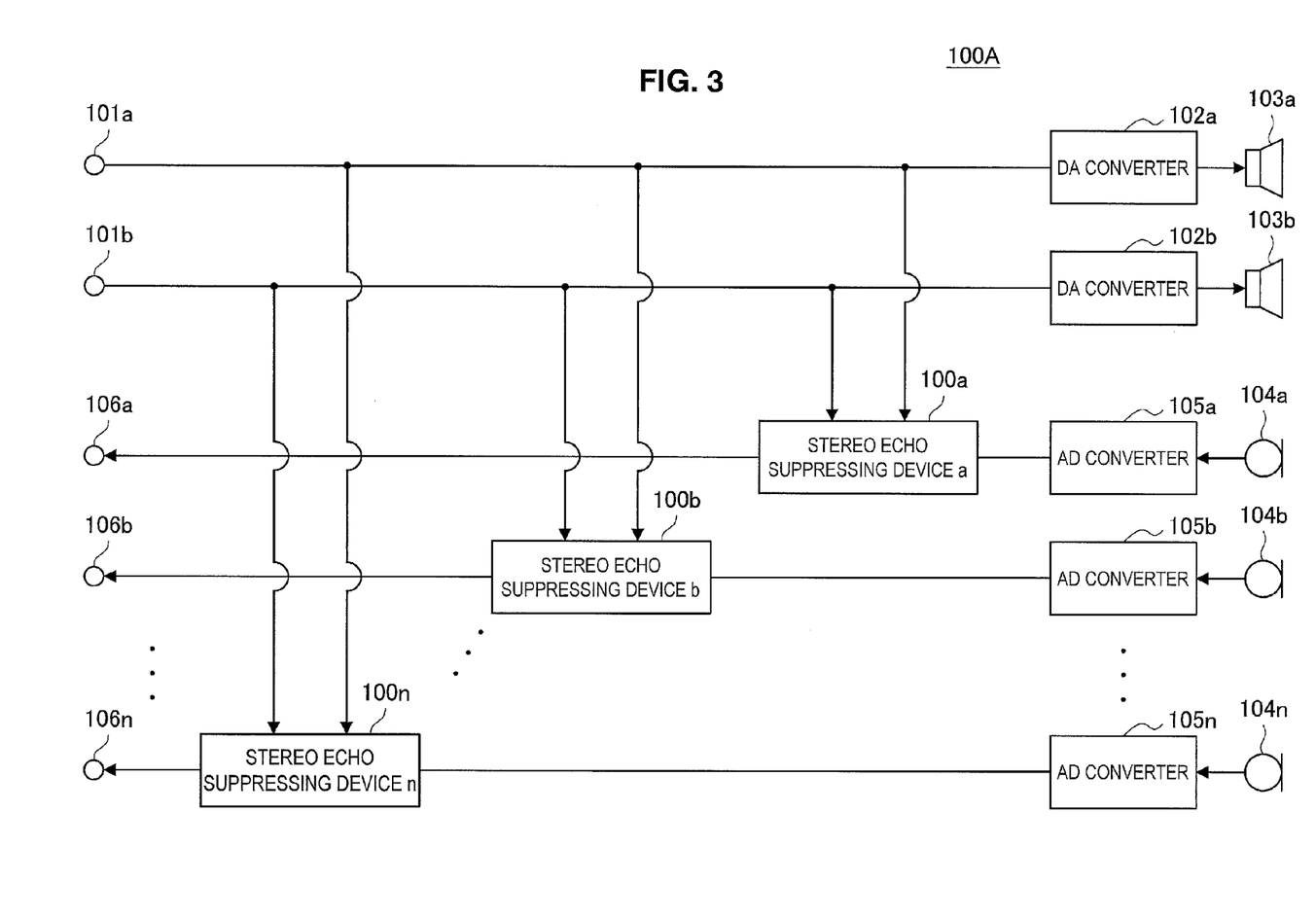
FIG. 3 is a block diagram in a case in which a plurality of the stereo echo suppressing devices according to the first embodiment are mounted.

For example, FIG. 3 is a block diagram showing a configuration of an echo suppressing device 100A in a case in which more microphones are extended in the echo suppressing device according to the first embodiment. Meanwhile, FIG. 4 is a block diagram showing a configuration of an echo suppressing device 200A in a case in which more microphones are extended in the echo suppressing device according to the second embodiment.

Figure 4:
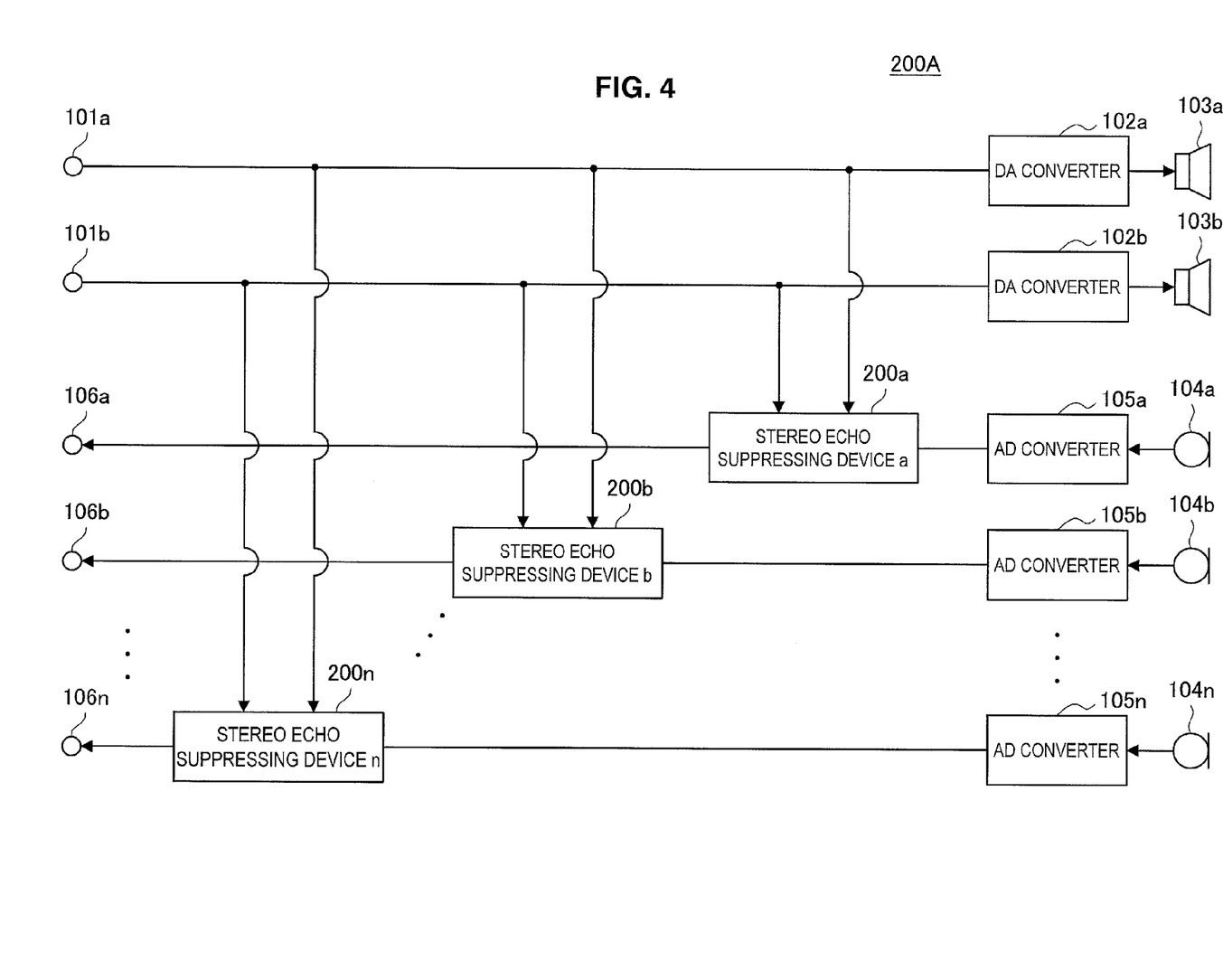
FIG. 4 is a block diagram in a case in which a plurality of the stereo echo suppressing devices according to the second embodiment are mounted.
Figure 5:
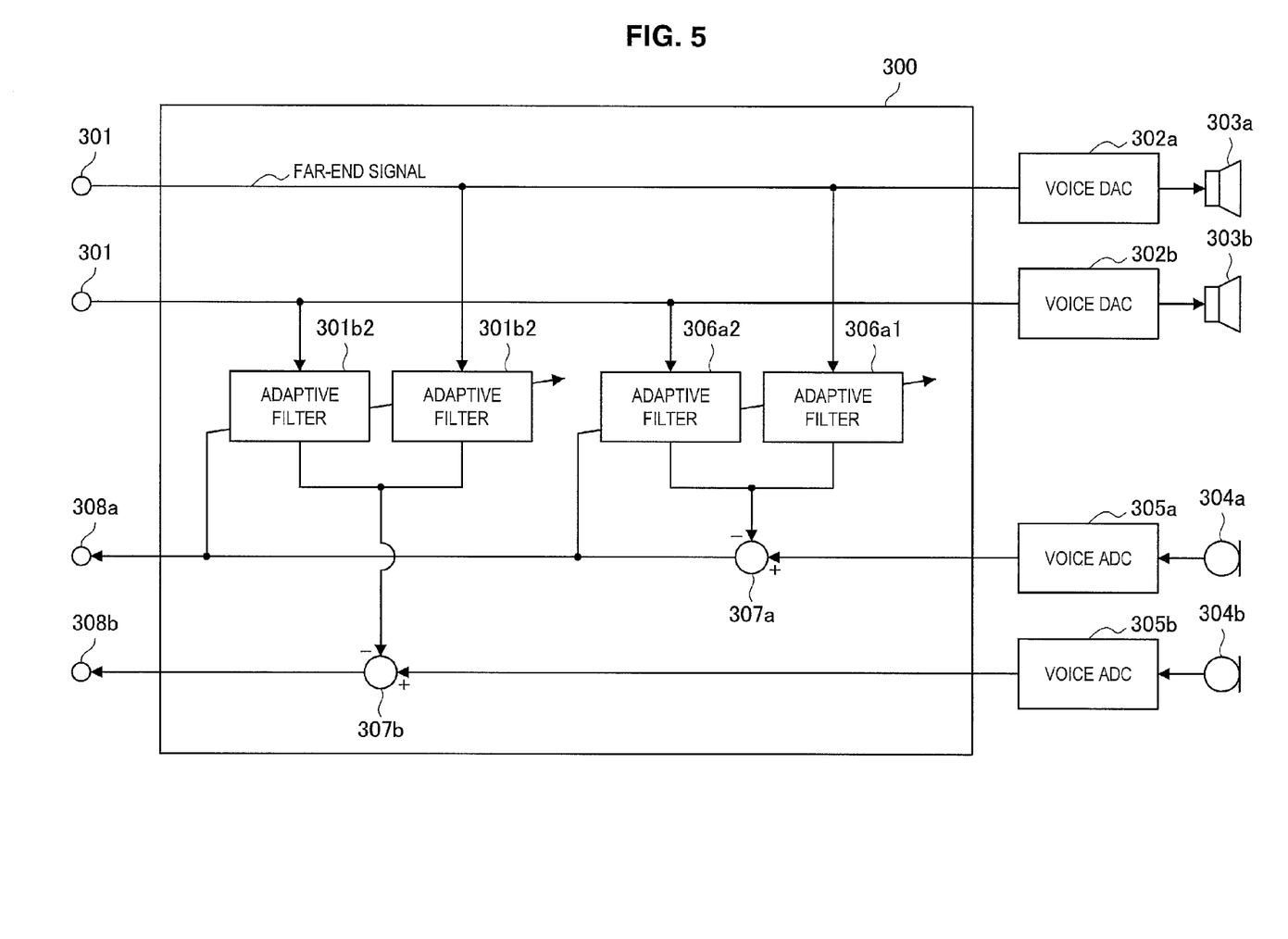
FIG. 5 is a block diagram illustrating an existing echo canceller.

With reference to FIGS. 3 and 4, as explained in the first and second embodiments, the echo suppressing device 100A (200A) receives far-end signals that are stereo signals of two channels (Left channel and Right channel), and includes stereo echo suppressing devices 100a, 100b, ..., 100n (200a, 200b, ..., 200n) for respective microphones 104a, 104b, ..., 104n. To configurations and processing operations of the stereo echo suppressing devices 100a, 100b, ..., 100n (200a, 200b, ..., 200n), the configurations and the processing operations explained in the first and second embodiment can be applied, respectively. Therefore, detailed explanations are omitted here. The effects similar to the first and second embodiment can be obtained also in the case of multi-channeled microphone input since stereo echo suppressing devices are provided in accordance with the extension of more microphones. A microphone extension condition is that more microphones can be extended under a processing limit of a processing device such as an implemented dedicated board, DSP, and CPU.

(C-2) For example, the echo suppressing device explained in each of the above-described embodiments may be mounted on a device including a voice communication device used for the teleconferencing system, the audio conferencing system, or the like. In addition, the echo suppressing device according to the embodiments of the present invention may be mounted on a mobile terminal such as a mobile phone or a smartphone.

Note that the stereo echo suppressing method of the embodiments described above can be configured as the stereo echo suppressing program. In the case of the stereo echo suppressing program, the program that implements at least part of the stereo echo suppressing method may be stored in a non-transitory computer readable medium, such as a flexible disk or a CD-ROM, and may be loaded onto a computer and executed. The recording medium is not limited to a removable recording medium such as a magnetic disk or an optical disk, and may be a fixed recording medium such as a hard disk apparatus or a memory. In addition, the program that implements at least part of the stereo echo suppressing method may be distributed through a communication line (also including wireless communication) such as the Internet. Furthermore, the program may be encrypted or modulated or compressed, and the resulting program may be distributed through a wired or wireless line such as the Internet, or may be stored a non-transitory computer readable medium and distributed.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A stereo echo suppressing device that suppresses an acoustic echo signal based on a near-end input signal and far-end signals of two channels as a stereo signal, the stereo echo suppressing device comprising:
a first far-end signal amplitude spectrum calculating unit configured to calculate an amplitude spectrum of a first far-end signal by transforming the inputted first far-end signal into a spectrum in a frequency domain;
a second far-end signal amplitude spectrum calculating unit configured to calculate an amplitude spectrum of a second far-end signal by transforming the inputted second far-end signal into a spectrum in a frequency domain;
a near-end input signal amplitude spectrum calculating unit configured to calculate an amplitude spectrum of the near-end input signal by transforming the inputted near-end input signal into a spectrum in a frequency domain;
a first estimation echo signal estimating unit configured to estimate an amplitude spectrum of a first estimation echo signal by multiplying a stored first echo path characteristic by the amplitude spectrum of the first far-end signal;
a second estimation echo signal estimating unit configured to estimate an amplitude spectrum of a second estimation echo signal by multiplying a stored second echo path characteristic by the amplitude spectrum of the second far-end signal;
a first echo suppressing unit configured to suppress the acoustic echo signal superimposed on the near-end input signal by calculating a first echo suppression gain with the amplitude spectrum of the first estimation echo signal and the amplitude spectrum of the near-end input signal;
a second echo suppressing unit configured to suppress the acoustic echo signal superimposed on the near-end input signal by calculating a second echo suppression gain according to a correlation result between the amplitude spectrum of the first estimation echo signal and the amplitude spectrum of the second estimation echo signal;
a first echo path characteristic updating unit configured to calculate and update the echo path characteristic of the first far-end signal by using the amplitude spectrum of the first far-end signal and the amplitude spectrum of the near-end input signal; and
a second echo path characteristic updating unit configured to calculate and update the echo path characteristic of the second far-end signal by using the amplitude spectrum of the second far-end signal and the amplitude spectrum of the near-end input signal.

2. The stereo echo suppressing device according to claim 1,
wherein the second echo suppressing unit includes:
a correlation component rejecting unit configured to reject a correlation component between the amplitude spectrum of the second estimation echo signal and the amplitude spectrum of the first estimation echo signal, at each frequency;
an echo suppression gain calculating unit configured to calculate a second echo suppression gain by using the amplitude spectrum of the near-end input signal and the amplitude spectrums of the estimation echo signals from which the correlation component has been rejected by the correlation component rejecting unit; and
an echo suppression processing unit configured to suppress the acoustic echo signal to be superimposed on the near-end input signal, by using the second echo suppression gain.

3. The stereo echo suppressing device according to claim 2,
wherein the correlation component rejecting unit rejects the correlation component by using a difference between the amplitude spectrum of the second estimation echo signal and the amplitude spectrum of the first estimation echo signal.

4. The stereo echo suppressing device according to claim 1,
wherein the second echo suppressing unit includes
a correlation calculating unit configured to calculate a correlation coefficient of the amplitude spectrums of the estimation echo signals by using the amplitude spectrum of the first estimation echo signal and the amplitude spectrum of the second estimation echo signal,
an echo suppression gain calculating unit configured to calculate a second echo suppression gain on the basis of the correlation coefficient of the amplitude spectrums of the estimation echo signals obtained by the correlation calculating unit, and
an echo suppression processing unit configured to suppress the acoustic echo signal to be superimposed on the near-end input signal, by using the second echo suppression gain.

5. An echo suppressing device comprising:
one or a plurality of the stereo echo suppressing device according to claim 1,
wherein the respective near-end input signals are inputted from one or a plurality of microphones.

6. A stereo echo suppressing method of suppressing an acoustic echo signal based on a near-end input signal and far-end signals of two channels as a stereo signal, the stereo echo suppressing method comprising:
calculating an amplitude spectrum of a first far-end signal by a first far-end signal amplitude spectrum calculating unit, by transforming the inputted first far-end signal into a spectrum in a frequency domain;
calculating an amplitude spectrum of a second far-end signal by a second far-end signal amplitude spectrum calculating unit, by transforming the inputted second far-end signal into a spectrum in a frequency domain;
calculating an amplitude spectrum of the near-end input signal by a near-end input signal amplitude spectrum calculating unit, by transforming the inputted near-end input signal into a spectrum in a frequency domain;
estimating an amplitude spectrum of a first estimation echo signal by a first estimation echo signal estimating unit, by multiplying a stored echo path characteristic of the first far-end signal by the amplitude spectrum of the first far-end signal;
estimating an amplitude spectrum of a second estimation echo signal by a second estimation echo signal estimating unit, by multiplying a stored echo path characteristic of the second far-end signal by the amplitude spectrum of the second far-end signal;

suppressing the acoustic echo signal superimposed on the near-end input signal by a first echo suppressing unit, by calculating a first echo suppression gain by using the amplitude spectrum of the first estimation echo signal and the amplitude spectrum of the near-end input signal;

suppressing the acoustic echo signal superimposed on the near-end input signal by a second echo suppressing unit, by calculating a second echo suppression gain according to a correlation result between the amplitude spectrum of the first estimation echo signal and the amplitude spectrum of the second estimation echo signal;

calculating and updating the echo path characteristic of the first far-end signal by a first echo path characteristic updating unit, by using the amplitude spectrum of the first far-end signal and the amplitude spectrum of the near-end input signal; and calculating and updating the echo path characteristic of the second far-end signal by a second echo path characteristic updating unit, by using the amplitude spectrum of the second far-end signal and the amplitude spectrum of the near-end input signal.

7. A non-transitory computer-readable recording medium storing a stereo echo suppressing program that suppresses an acoustic echo signal based on a near-end input signal and far-end signals of two channels as a stereo signal, the stereo echo suppressing program causing a computer to function as:

a first far-end signal amplitude spectrum calculating unit configured to calculate an amplitude spectrum of a first far-end signal by transforming the inputted first far-end signal into a spectrum in a frequency domain;

a second far-end signal amplitude spectrum calculating unit configured to calculate an amplitude spectrum of a second far-end signal by transforming the inputted second far-end signal into a spectrum in a frequency domain;

a near-end input signal amplitude spectrum calculating unit configured to calculate an amplitude spectrum of the near-end input signal by transforming an inputted near-end input signal into a spectrum in a frequency domain;

a first estimation echo signal estimating unit configured to calculate an amplitude spectrum of a first estimation echo signal by multiplying a stored echo path characteristic of the first far-end signal by the amplitude spectrum of the first far-end signal;

a second estimation echo signal estimating unit configured to calculate an amplitude spectrum of a second estimation echo signal by multiplying a stored echo path characteristic of the second far-end signal by the amplitude spectrum of the second far-end signal;

a first echo suppressing unit configured to suppress the acoustic echo signal superimposed on the near-end input signal by calculating a first echo suppression gain by using the amplitude spectrum of the first estimation echo signal and the amplitude spectrum of the near-end input signal;

a second echo suppressing unit configured to suppress the acoustic echo signal superimposed on the near-end input signal by calculating a second echo suppression gain according to a correlation result between the amplitude spectrum of the first estimation echo signal and the amplitude spectrum of the second estimation echo signal;

a first echo path characteristic updating unit configured to calculate and update the echo path characteristic of the first far-end signal by using the amplitude spectrum of the first far-end signal and the amplitude spectrum of the near-end input signal; and a second echo path characteristic updating unit configured to calculate and update the echo path characteristic of the second far-end signal by using the amplitude spectrum of the second far-end signal and the amplitude spectrum of the near-end input signal.

* * * * *